INVENTORS
WILLIAM M. HARCUM
JOHN M. SLATER
BY
Herbert N. Thompson
their ATTORNEY.

Patented Feb. 5, 1952

2,584,127

UNITED STATES PATENT OFFICE 2,584,127

SERVO SYSTEM

William M. Harcum, Mineola, and John M. Slater, Garden City, N. Y., assignors to The Sperry Corporation, a corporation of Delaware Application December 5, 1946, Serial No. 714,282

13 Claims. (Cl. 102—50)

This invention relates generally to servo systems and, in particular, to servo systems adapted to displace control surfaces of navigable craft in response to error signals from a reference device.

A principal aim in the design of navigable craft, particularly aircraft including long range craft, guided missiles and the like is the conservation of space and weight which entails, as an important item thereof, the reduction in space and weight of power supplies or power supply equipment for use in the operation of essential power-operated mechanisms.

Ordinarily, depending upon the particular design of equipment used in flight control work, special power-generating apparatus is used or the equipment is designed to operate on the power available from the airborne power supplies. For example, if electrical motors are employed as prime movers or servomotors in the actuation of control surfaces of the craft, an electrical power supply must be provided therefor. Alternatively, if hydraulic or pneumatic motors are used, compressors or pumps must be provided.

Marked weight and space conservation, from a practical standpoint, are realized according to the present invention by providing simple, compact servomotors with simple controls in combination with a source of power requiring a minimum of space and weight considering the power output derived from the servomotors. Briefly, we propose to employ a lightweight servo of the expansion chamber type or of any simple, pressure-operated motor design, the power in which is developed by the chemical action of one or more reagents, which reagents need occupy but a relatively small volume of space and which may be of relatively light weight as compared to other power sources while providing the requisite amount of power output from the servos. For example, comparing the volume requirements of a power source using compressed air as the motivating power with the volume requirements of the instant invention, it is estimated that, for the same power output, the apparatus of the instant invention needs only one-twentieth of the volume that would be needed by the compressed air power source. Also, the amounts of such agents need only be sufficient, for example, to last throughout a predetermined flight or period of time.

Further, in accordance with another embodiment of our invention, we realize a high conservation of space and weight by tapping and directly utilizing the power developed by the power plant or engine employed in propelling the craft, since this equipment is essential, and such conservation is achievable as a practical matter in those types of power plants providing a constantly available and directly usable pressure. Alternatively, in particular types of craft, the fuel employed in propelling the craft is of such character that it may be tapped from the supply and employed for the purpose of driving a servomotor as contemplated in the present invention.

By employing a simple type of servo mechanism and obtaining power therefor in the above described manners, substantially a minimum amount of additional equipment is required, and no additional equipment so far as the power supply is concerned. The aims of the present invention in space and weight conservation are realized to a high degree in connection with craft employing jet or rocket type propulsion motors. In these types of craft, the admixture of two or more reaction agents provides a continuously available source of power for driving a servomotor of the expansion chamber or any pressure driven type, and the equipment necessary to control the pressures developed by the agents in operating the servomotors may be extremely simple, of light weight and of small bulk.

In connection with the embodiment of our invention wherein we provide a servomotor mechanism and sources of at least two reaction agents, it will be observed that the power output derivable from the reaction products of these agents will be far greater than that from some power source embodying stored or potential energy such as compressed gases, and the like, for practically equal space and weight values of the two types of systems.

More particularly, the instant invention provides a servomotor with means for creating a motive force therein of a substantially steady nature and of a magnitude that is dependent upon an error signal from a reference device. By operatively connecting the servomotor to the control surface of a navigable craft, the motive force within the servomotor may be made responsive to an error signal given by a reference device which in turn may be made dependent upon a force, a displacement, or a displacement of the craft itself, or any combination thereof.

In accordance with the above, novel means for providing the servomotor with a controllable motive force comprises utilizing the pressure ensuing from the union of certain chemically reactive agents, the pressure created by that union being dependent upon the time rate of union of the chemicals. Therefore, by controlling the admixture of these chemicals in response to an error signal, a motive force, responsive to that error signal, may be obtained. Thus, by operatively connecting the servomotor to a control surface and by establishing a reference device having a signal output that is dependent upon either the position of, or force active on, the control surface, or upon the attitude of the craft itself, a servo system is provided which serves to provide a motive force for the control surface in accordance with any desired reference. It is to be noted that the word "attitude" used herein includes position relative to any of the longitudinal, transverse or pitch axes.

The servo system herein disclosed has particular adaptation to navigable craft of the type using chemically reactive agents as a means for supplying the motive force of the craft itself. Thus, it is an object of the instant invention to provide a servo system for displacing control surfaces of navigable craft, particularly in the case of navigable craft of the rocket type. However, it is to be noted that while the primary use may be in connection with rocket-type craft, nevertheless, the system herein described is not limited thereto. It is adapted to any system requiring a force or displacement responsive output. Also, the use of the phrase "error signal" is herein intended to apply to that signal which not only creates an output responsive to a relative displacement between a reference device and the element sought to be moved or positioned, but also includes a feed-back element, which will tend to eliminate the error signal as the object sought to be displaced comes into agreement with the reference device. Hence, in systems requiring a simple displacement relative to a reference, the error signal will be considered zero when the displacement of the object to be positioned and the reference device are in relative agreement. Similarly, where the system is applied to displace an object against a force, the reference device being a suitable force responsive reference, the error is considered to be zero when the force created by the servo system is adequate to overcome the force as determined by the reference device.

The invention in another of its aspects relates to novel features of the instrumentalities described herein for achieving the principal objects of the invention and to novel principles employed in those instrumentalities, whether or not these features and principles are used for the said principal objects or in the field.

A further object of the invention is to provide improved apparatus and instrumentalities embodying novel features and principles, adapted for use in realizing the above objects and also adapted for use in other fields.

Fig. 1 discloses a servo system embodying the instant invention as applied to a control surface of a navigable craft including a force feed-back element.

Figure 1:
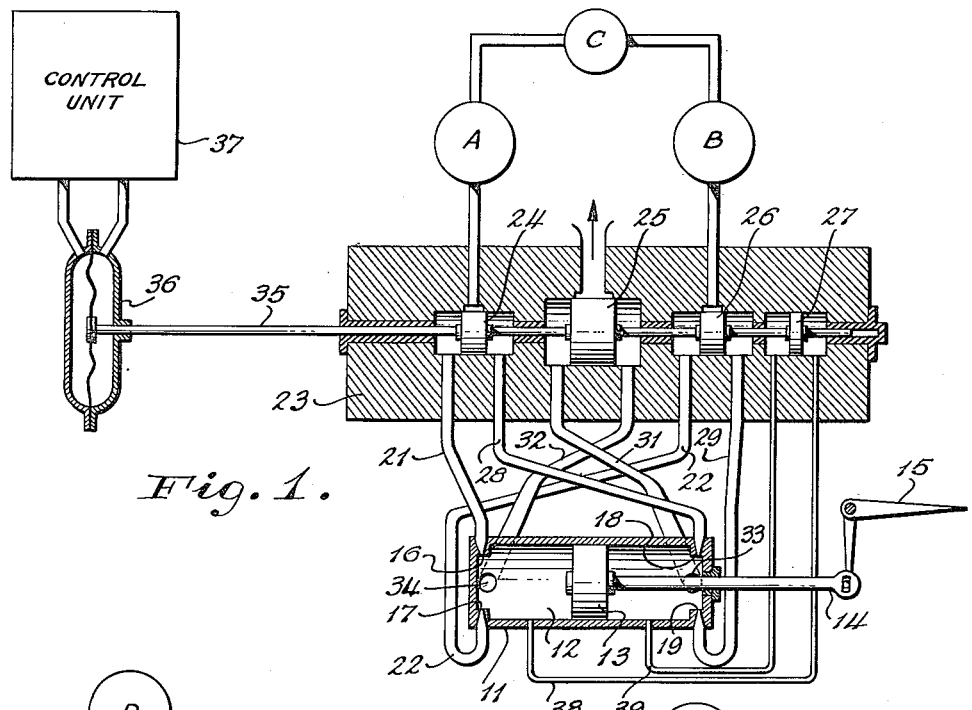

Referring now to Fig. 1, a servomotor 11 is provided having reaction chamber 12 with a movable element or piston 13, therein, which in turn is operatively connected through the arm 14 to the object to be controlled, which in this instance is the control surface 15. The connecting mechanism between the arm 14 and the control surface 15 is not included in detail but may embrace any of many well-known mechanisms. The reaction chamber 12 is provided with two pairs of inlet ports including ports 16 and 17 on the left side and ports 18 and 19 on the right. Ports 16 and 17 are in turn connected through the conduits 21 and 22 respectively through the valving mechanism 23 (to be more fully described later) to a source A and B. A and B are sources of chemically reactive agents of the type ordinarily employed as rocket propelling chemicals. There are many known pairs of agents for A and B that would be suitable for the instant system, among which are aniline and fuming nitric acid; hydrogen peroxide and liquid ammonia. Another acceptable combination is hydrazine and hydrogen peroxide. Many other pairs of agents could be mentioned, such as liquid hydrogen and liquid oxygen, but the above are set forth to establish the general class of acceptable chemical reagents. In order to prevent the high pressure generated within the chamber 12 from causing the chemicals A and B to back into their supply source, a pressure unit C is provided for maintaining a substantially static pressure in the supply sources A and B which at all time will be in excess of any pressure that may be created within the chamber 12. As this supply pressure is a non-working source of energy, it is not destroyed and, once charged to a certain pressure, will substantially maintain that pressure except as the supply of chemicals A and B are diminished.

Returning now to the valve 23, this valve is provided with pistons 24, 25, 26 and 27. Piston 24 serves to direct the flow of chemical A either through conduit 21 into the left-hand side of chamber 12 through port 16 or through conduit 28 into the right-hand side of chamber 12 through port 18. Piston 26 in turn serves to control the supply of chemical B through conduit 22 into the left-hand side of chamber 12 through port 17 or through conduit 29 into the right-hand side of chamber 12 through port 19. The piston 25 serves to connect the outside atmosphere through conduits 31 or 32 with either the right-hand exhaust port 33 or the left-hand exhaust port 34 of the chamber 12. Serving to connect these pistons in fixed relation to each other is the rod 35 which in turn is positioned by actuator 36, which is responsive to a control unit 37. Thus, if the rod 35 is positioned to the left by the control unit 37 and actuator 36, chemical A will flow from its supply source through conduit 28 to port 18 of chamber 12. Exhaust port 33 will be closed by the piston 25, and chemical B will flow through conduit 29 through port 19 into the chamber 12. As hereinbefore mentioned, chemicals A and B have been so chosen to be of a mutually reactive type and are productive of very high pressures and temperatures upon union. Therefore, if chemicals A and B enter the right-hand side of chamber 12 through ports 18 and 19 respectively, they will immediately unite and a very high pressure will be created within chamber 12. Piston 13 will accordingly be displaced to the left of this chamber in response to the motive force created by this high pressure.

Now, as the chemicals A and B unite within the chamber 12 and produce a displacement of piston 13 to the left, connecting rod 14 will be similarly displaced to the left and being operatively connected to the control object or control surface 15, will accordingly produce a displacement of that surface. In the embodiment set forth in Fig. 1, control unit 37 may be of a type responsive to craft attitude and consequently productive of an error signal dependent upon deviations of the craft from a predetermined reference attitude. Consequently, if the control surface 15 is displaced, thereby causing a deviation of craft attitude, the control unit 37 will sense that deviation and at such time, if the reference device is in agreement with the new craft attitude, the error signal produced therein will be eliminated. As the error signal is changed in sense, the actuator 36 will displace the rod 35 to the right in an amount dependent upon that error signal. If the error signal is of sufficient strength in an opposite sense than the one heretofore analyzed, the rod 35 will be displaced to the right, thereby opening exhaust port 33 of the chamber 12 thereby reducing the pressure and consequently reducing the motive force within the chamber 12, causing the piston 13 to assume some neutral position. If the error signal from the control unit persists in an opposite sense than the one heretofore assumed, the actuator 36 will act to displace the rod 35 to the right. This in turn will cause chemicals A and B to be transmitted through conduits 21 and 22 into the left-hand side of chamber 12, cause exhaust port 34 to be closed, and will be productive of a reaction on the left-hand side of chamber 12, causing piston 13, rod 14, and the control surface 15, to be displaced in an opposite sense. It is in this fashion that the displacement of the control surface is made responsive to an error signal which in turn controls the admixture of certain reactive chemicals within the chamber 12 thereby controlling the motive force of servomotor 11 in response to that error signal.

In some cases a force feed-back system is desirable for modifying the error signal in accordance with the motive pressure within chamber 11. Consequently, in this particular embodiment, conduits 38 and 39 are shown connecting opposite sides of the chamber 12 to a fourth piston 27, of valve 23 which is also fixedly displaced with relation to the other pistons 24, 25 and 26. In this fashion the servomotor is made responsive to force variations that may occur in the object to be controlled, which in this case is the control surface 15.

Figures 2, 3:
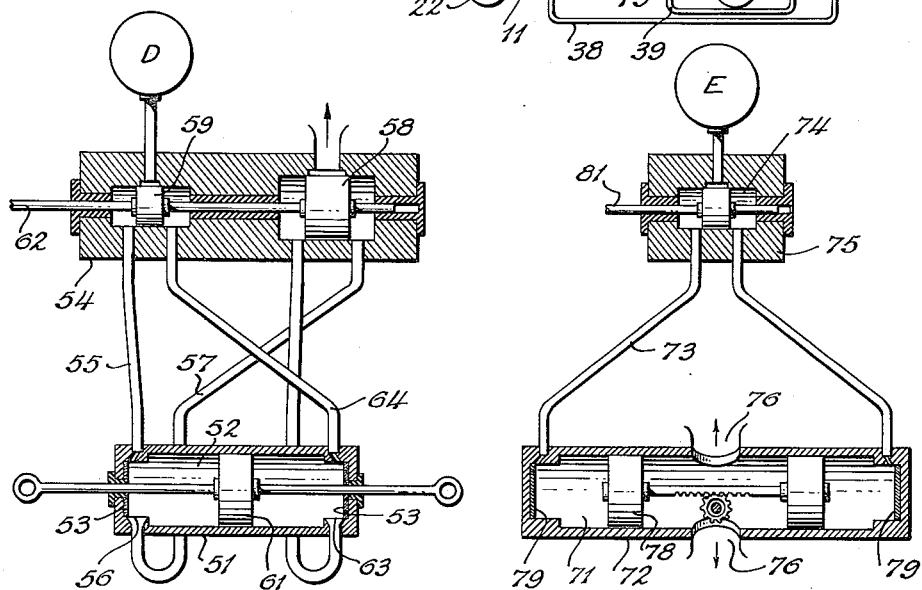
Fig. 2 illustrates a similar servo system adapted for use with a single chemical agent, catalytic means for decomposing the agent being contained within the reaction chamber of the servomotor.
Fig. 3 illustrates a modification of the system shown in Fig. 2.

If it is desired to controllably introduce but a single chemically reactive agent, a catalyst, causing the rapid decomposition of the introduced agent upon contact, may be displayed on porous refractory brick, or other suitable carrier, as set forth in the embodiment illustrated in Fig. 2. In this arrangement, the servomotor 51 is provided with a combustion chamber 52 having catalyst agent 53 affixed to its interior surface shown at Fig. 2. Chemical D, a chemical capable of rapid decomposition upon contact with catalyst 53, is controllably introduced through valve 54 and conduit 55 into the chamber 52. Upon entrance into the chamber 52, chemical D, which may be hydrogen peroxide, will come in contact with a catalyst agent 53 which may be calcium permanganate decomposing the hydrogen peroxide and creating a very high pressure within chamber 52. During this decomposition, the exhaust port 56 is closed by means of the conduit 57 and the piston 58 of valve 54. The piston 59 of valve 54 would be in a right-hand position for this action. If a displacement of the piston 61 to the left were desired, control rod 62, which connects piston 58 and 59 of the valve 54 in fixed relation, must be moved to the left, opening exhaust port 56, closing the exhaust port 63 and introducing a quantity of chemical D through the conduit 64 into the chamber 52, thereupon reacting upon contact with the catalyst 53 and creating a high pressure within that chamber. This high pressure will serve to create a motive force causing displacement of the piston 61 to the left. The control unit and actuator have been omitted in this embodiment though they may be similar to the control unit and actuator appearing in Fig. 1. Further simplification of the system described in Fig. 2 appears in Fig. 3 wherein chemical E is introduced into the chamber 71 of the servomotor 72 through conduit 73 when the piston 74 of valve 75 is in a right-hand position. A bleed is provided past each piston, which may be achieved merely by fitting the pistons loosely. Exhaust ports 76 have been provided in the servomotor 72 opening the mid-section of the chamber 71 to the atmosphere. Thus, as pressure is raised by the catalyzed decomposition of the chemical E exhaust materials may flow around the pistons 78 and into the atmosphere. The catalyst agent 79 may be similar to the catalyst agent of Fig. 2. Once again the control unit and actuator for the valve rod 81 have not been described but may be of a type similar to that contained in Fig. 1. The apparatus set forth in Fig. 3 has the advantage of simplicity and is more stable and slower reacting than the apparatus heretofore disclosed. The pressure created by flow of chemical E into the chamber 71 must at all times be greater than the leakage flow of the bi-products of the reaction around the piston 78 as long as an error signal persists.

In the event that the instant servomotor is to be adapted for use on a navigable craft of the type employing reactant chemicals for its motive power, the embodiment set forth in Fig. 1 may be considerably simplified. The chamber 11 need not be a combustion chamber, as the combustion may now take place in the combustion chamber of the navigable craft and the servomotor provided with a motive force that is derived from the craft combustion chamber. The servo system would then employ pressure conduits from the craft motive power source to the servomotor and control of the motive power within the servomotor in response to an error signal may be obtained through control of the servomotor exhaust.

Figure 4:
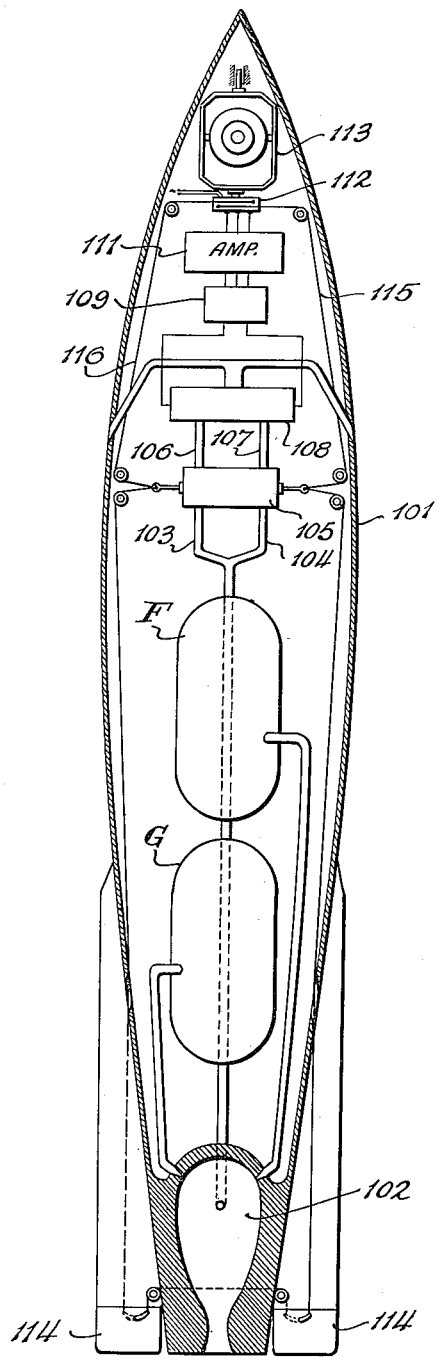
Fig. 4 illustrates one embodiment of the instant invention as applied to control the surface control of a craft of the type propelled by a motive force resulting from the unit of certain chemically reactant agents.

The apparatus of Fig. 4 illustrates this arrangement. In Fig. 4, a missile 101 shown herein as illustrative of the type of navigable craft to which our invention is particularly adaptable and having a thrust motor 102 utilizing the motive force obtained through the reaction of chemicals F and G therein, is provided with conduits 103 and 104 leading to the main servomotor 105. The servomotor 105 may be similar to the servomotor 11 as described in detail in connection with Fig. 1. However, in this instance, servomotor 105 is provided with the exhaust ports 106 and 107 leading through the relay valve 108 into the atmosphere. Relay valve 108 is illustrated as being controlled by the actuator unit 109 of a type that may be responsive to the signal output from an amplifier such as 111, which in turn is responsive to the error signal emanating from the pick-off 112, attached to the reference, such as the gyro 113 in this instance. A position repeat back, for positioning one element of the pick-off 112, in accordance with the displacement of control surface 114, in response to movement of the servomotor 105, through lines 115 and 116, is provided.

Thus on the occurrence of an error signal, relay valve 108 is displaced either to the right or to the left, in the figure, permitting either the right or left chamber (not shown) of the servomotor 105 to be connected with the exhaust. Inasmuch as equal pressure originally was supplied to both sides of servomotor 105 through conduits 103, 104, the servomotor will be displaced in accordance with the action of the relay valve in opening either one side or the other side of the servomotor chamber to the atmosphere. Thus, by connecting the displaceable element or the piston of the servomotor with the surface controls 114, these surface controls are supplied with a motive force which is responsive to the error signal. It must be understood that while the instant embodiment sets forth an arrangement wherein the servomotor employs the same chemical agents as are employed to create a motive force for the craft itself, it is within the scope of the instant invention to provide an arrangement wherein the servomotor is supplied with chemicals different from the craft propellants. More particularly, these instances are shown in more detail with relation to Figs. 1, 2, and 3.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a rocket-type craft having control surfaces and sources of chemical agents for producing a motive force, the combination therewith of a servomotor including means defining an expansible chamber, means operatively connected with said chamber defining means for supplying a force to said control surfaces in accordance with expansion and contraction of said chamber, and means for supplying at least one of said agents in a regulatable quantity as an input to said chamber to produce therein, by the reaction products of said chemicals, a motive force of a substantially steady magnitude dependent upon the rate of supply of said agents to said chamber.

2. The combination of claim 1, said supplying means being a signal responsive valve device.

3. In a rocket-type craft having control surfaces and sources of chemical agents for producing a motive force, the combination therewith of a servomotor including means defining an expansible chamber, means operatively connected to said chamber defining means for controlling said control surfaces, and means for separately supplying said agents in regulatable quantities as an input to said chamber to produce therein by the reaction products of said chemicals, a motive force of a substantially steady magnitude dependent upon the rate of supply of said agents to said chamber.

4. In a rocket-type craft having control surfaces and sources of chemical agents for producing a motive force, the combination therewith of a servomotor having an expansion chamber, an element movably fitted therewithin, means operatively connected with the movable element for controlling said control surfaces, a supply of one of said chemical agents being located within said expansion chamber, and means for supplying the other of said agents in regulatable quantities as an input to said chamber to produce therein from the resulting chemical reaction, a motive force of a substantially steady magnitude dependent upon the rate of supply of chemicals to said chamber.

5. In a rocket-type craft having control surfaces and sources of chemical agents for producing a motive force, the combination therewith of a servomotor having an expansible-type chamber, an element movably positioned therewithin, means operatively connected with the movable element for controlling said control surfaces, and means for supplying at least one of said agents in regulatable quantities as an input to said chamber to produce a motive force of a substantially steady magnitude dependent upon the amounts of chemicals mixed within said chamber.

6. The combination of claim 5 further including force feed back means connecting said expansion chamber with said supply means in an opposing restoring manner.

7. In a rocket-type craft having control surfaces and sources of chemical agents for producing a motive force, one of the chemical agents being capable of rapid decomposition on contact with a second agent with development of decomposition products at elevated pressure and temperature, the combination therewith of a servomotor having an expansible-type chamber, an element movably positioned therewith, means operatively connected with the movable element for controlling said control surfaces, means for supplying the first agent in regulatable quantity to said chamber, a second agent within said chamber for producing in that chamber by such decomposition, a motive force of a substantially steady magnitude dependent upon the amounts of chemicals admixed within said chamber.

8. The combination of claim 7, said second agent being in the nature of a catalyst, and said chemical agent being capable of decomposition on contact with said catalyst agent.

9. In a rocket-type craft having control surfaces and sources of chemical agents for producing a motive force, wherein the motive force is obtained from the mixture of chemical agents, the combination therewith of a servomotor having an expansion chamber, an element movably fitted therewithin, means operatively connected with the movable element for controlling said control surfaces, means for supplying at least one of said agents in regulatable quantities as an input to said chamber to produce therein by the reaction products, a motive force of a substantially steady magnitude dependent upon the amounts of chemicals admixed within said chamber, reference means for controlling craft attitude, a signalling device connected to supply a signal when said reference and said craft attitude are in disagreement, and means controlled by the output of said signalling device for controlling the motive pressure in said motor.

10. The combination of claim 9 including, force feed back means connecting said expansion chamber with said signalling device, said force feed back means being connected in a sense to oppose the signal supplied by said signalling device.

11. In a rocket-type craft having control surfaces and sources of chemical agents for producing a motive force, wherein the motive force is obtained from the mixture of chemical agents, the combination therewith of a servomotor including a chamber of the expansible-type, means for supplying at least one of said agents in a regulatable quantity as an input to said motor to produce therein, a motive pressure of a substantially steady magnitude dependent upon the rate of admixture of chemicals therein, means connecting said servomotor to operate said control surfaces, attitude reference means for controlling the direction of craft movement, pick-off means for supplying a signal when the reference and attitude of said craft disagree, and means controlled by said pick-off for controlling pressure within said servomotor.

12. In a rocket-type craft having control surfaces and sources of chemical agents for producing a motive force, wherein the motive force is obtained from the mixture of chemical agents, the combination therewith of a servomotor connected to operate said control surfaces, means for supplying said agents in regulatable quantities as an input to said servomotor to produce therein, a motive pressure of a substantially steady magnitude dependent upon the amount of admixture thereof, reference means for controlling craft movement, pick-off means for supplying a signal when craft position differs from said reference means, and means controlled by said signal for controlling the pressure within said servomotor.

13. In a rocket-type craft having control surfaces and sources of chemical agents for producing a motive force, wherein the motive force is obtained from the mixture of chemical agents, the combination therewith of a pressure actuated servomotor including a chamber with a movable element connected to operate said control surfaces, at least one of said agents being supplied in regulatable quantities as an input to said chamber to produce therein, a motive force of a substantially steady magnitude dependent upon the amount of admixture thereof, reference means for controlling craft movement, pick-off means for supplying a signal when craft movement differs from said reference means, and means controlled by said signal for controlling the pressure within said chamber.

WILLIAM M. HARCUM.
JOHN M. SLATER.

REFERENCES CITED

The following references are of record in the file of this patent:

UNITED STATES PATENTS

| Number | Name | Date |
|---|---|---|
| 1,879,187 | Goddard | Sept. 27, 1932 |
| 2,083,654 | Kochmann | June 15, 1937 |
| 2,140,037 | Swisher | Dec. 13, 1938 |
| 2,210,916 | Kenyon et al. | Aug. 13, 1940 |
| 2,398,201 | Young et al. | Apr. 9, 1946 |
| 2,413,621 | Hammond, Jr. | Dec. 31, 1946 |

FOREIGN PATENTS

| Number | Country | Date |
|---|---|---|
| 625,104 | France | Apr. 19, 1927 |
| 879,835 | France | Dec. 10, 1942 |

OTHER REFERENCES

"Industrial Bulletin" of Arthur D. Little, Incorporated, April, 1946, No. 220, page 2.

"Industrial and Engineering Chemistry," February, 1946, volume 38, No. 2, pages 160–161.